Dec. 23, 1969　　　　L. L. NOVAK　　　　3,485,324

PISTON COOLING SYSTEM

Filed Nov. 7, 1967

Inventor
Leo L. Novak
By Arthur Nelson
Attorney

United States Patent Office 3,485,324
Patented Dec. 23, 1969

3,485,324
PISTON COOLING SYSTEM
Leo L. Novak, San Diego, Calif., assignor to Allis-Chalmers Manufacturing Company, Milwaukee, Wis.
Filed Nov. 7, 1967, Ser. No. 681,138
Int. Cl. F01m 1/00; F16n 47/06
U.S. Cl. 184—6
7 Claims

ABSTRACT OF THE DISCLOSURE

An engine lubricating and cooling system for an internal combustion engine. A main oil gallery provides lubrication for the engine bearings while a piston cooling gallery operates only when sufficient pressure is present in the main oil gallery. A valve controls the flow of pressurized lubricant for cooling the pistons responsive to the main gallery oil pressure.

---

This invention relates to an engine lubricating system and more particularly to a combination engine lubricating and piston cooling system.

The increased power output of the modern internal combustion engine requires greater release of heat in the combustion chamber area. This in turn creates increased thermal stresses in this area of the engine which must be controlled. The conventional cooling system for the internal combustion engine does not have adequate capacity to cool the parts such as the pistons which are in direct contact with the products of combustion in the engine. Accordingly, an additional means of dissipating heat must be provided.

Some engines have been provided with a separate system wherein an oil pump creates pressurized fluid forcing a stream of oil through a jet onto the cylinder walls. Other systems devised combine the oil cooling system with the lubricating system which may reduce the reliability of the main lubricating system. This invention is designed to overcome the shortcomings of the conventional systems used for cooling the pistons and the cylinder walls.

Accordingly, this invention provides a main oil gallery for positive lubrication of the main and crank pin bearings and such other moving parts within the engine. Combined with the lubricating oil gallery is a piston cooling gallery which operates only when a sufficient pressure is present in the main oil gallery. The valve controlling flow of pressurized fluid for cooling of the pistons is responsive to main gallery oil pressure. The system also includes relief valves to return excess oil to the oil reservoir when a predetermined pressure is reached, and also a safety valve in the form of a high pressure relief valve is built into the system in combination with the oil pump. The oil in the system is cooled and filtered to maintain satisfactory operating conditions in the system and assure positive lubrication and cooling of the pistons when the engine is operating under a predetermined load and speed.

It is an object of this invention to provide a bearing lubricating and a piston cooling system.

It is another object of this invention to maintain pressure in the oil lubricating system and operate a piston cooling system in response to lubricating oil pressure.

It is a further object of this invention to provide an oil cooler for bearing lubrication and piston cooling oil and an oil filter for filtering the lubricating oil.

It is a further object of this invention to provide a combination main oil gallery lubricating circuit and a branch piston cooling circuit having oil cooling means for cooling the inner head of the pistons while maintaining positive lubrication pressure in the main oil gallery.

The objects of this invention are accomplished by pressurizing oil received from the oil reservoir of the internal combustion engine. The pressurized oil is forced through an oil cooler and then an oil filter before it is delivered to the main oil gallery for lubricating the main bearings and the crank pin bearings and other such bearings inherent in an internal combustion engine. A second gallery is connected intermediate the oil cooler and the oil filter which supplies pressurized oil to the piston cooling gallery. The piston cooling gallery consists essentially of a plurality of nozzles which spray oil on the interior side of the pistons which form a portion of the combustion chamber. The oil flow through the piston cooling gallery is controlled by a piston cooling regulating valve at the entrance of the piston cooling gallery which has an actuating portion in the main oil gallery and is operated in response to a predetermined pressure in the main oil gallery. The oil pump supplying the pressurized fluid to both galleries is constructed with a high pressure relief valve. The fluid is returned through the high pressure relief valve directly to the oil reservoir. A third valve is included in the main oil gallery which permits return of excess pressurized fluid in the main oil gallery when the pressure rises above a predetermined value. The oil is returned from the pressure relief valve in the main oil gallery to the oil reservoir.

The system provides for positive lubrication of all moving parts in the internal combustion engine. When the engine is operating at low speed, the piston cooling gallery is shut off and all the pressurized fluid is directed through the main oil gallery to maintain positive lubrication. The main oil gallery pressure is an infallible guide to determine when lubrication requirements are satisfied for the engine, since it is not effected by flow resistance upstream from the valve. The piston cooling gallery operates in response to the main oil gallery pressure which is responsive to engine speed and load conditions.

The preferred embodiment of this invention is illustrated in the attached drawing, and will be described in the following paragraph.

Figure 1:
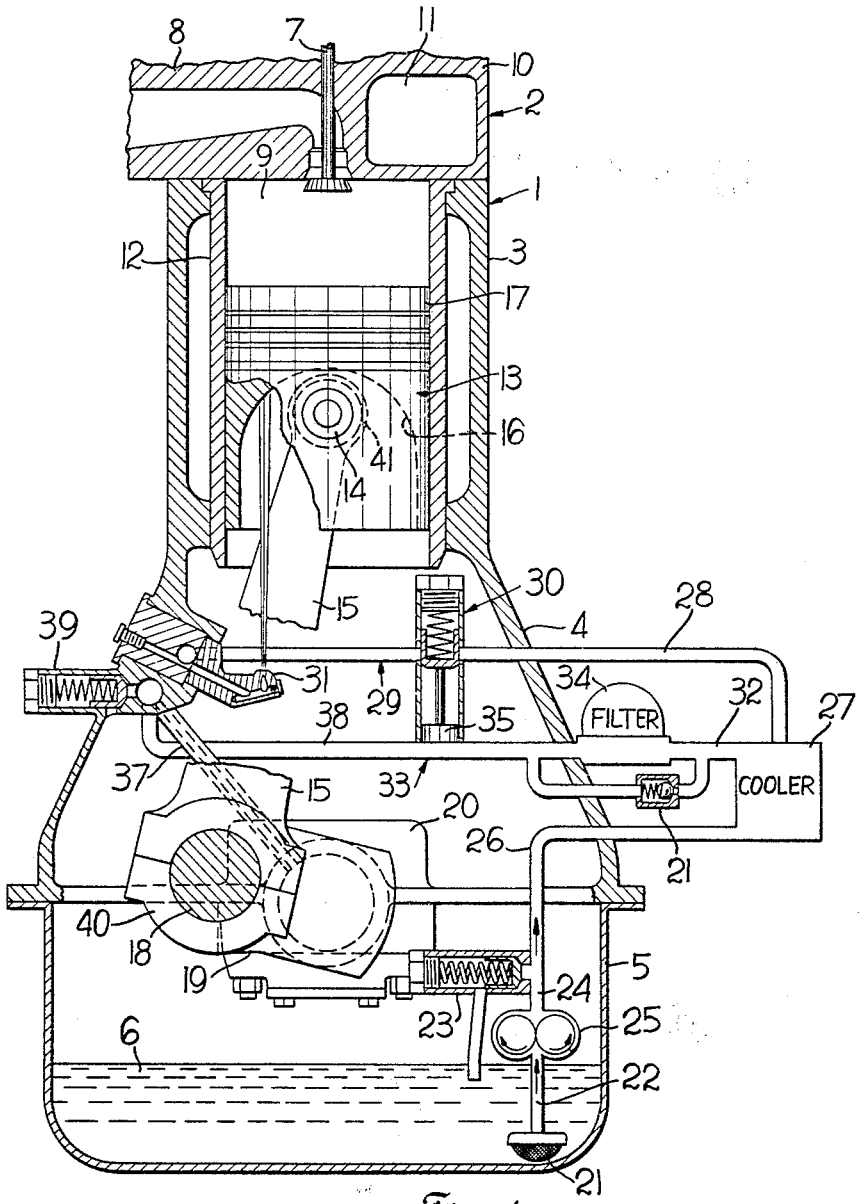
FIG. 1 illustrates schematically a lubricating and cooling system.
Figure 2:
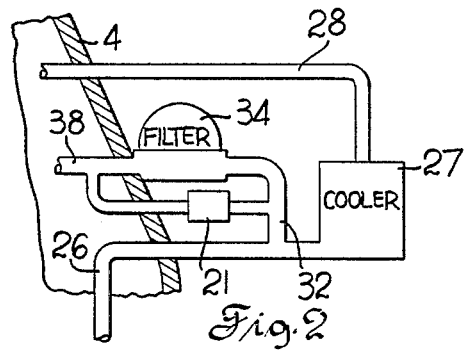
FIG. 2 shows a parallel arrangement of cooler and filters in the system.

Referring to the drawing, the engine 1 includes a head 2 and block 3 connected to the crankcase 4. Crankcase 4 is fastened to the oil pan 5 confining a body of oil 6, in the reservoir formed by the oil pan 5. The head 2 is shown in cross section with the intake valve 7 in the open position permitting intake of air through the manifold 8 into the combustion chamber 9.

The head also shows the exhaust manifold 10 defining the passage 11 to permit exhaust of the products of combustion from the combustion chamber 9.

The block 3 receives a plurality of sleeves 12 which in turn receive a plurality of pistons 13. The piston 13 is shown connected to the wrist pin 14 carrying the connecting rod 15. The piston 13 defines a generally semispherical recess 16 on its interior portion. The head 17 of the piston 13 defines a portion of the combustion chamber 9.

The connecting rod 15 extends downwardly to receive the crankpin 18 which is a part of the crankshaft 19. The crankshaft 19 is journaled within main bearing 20 which is integral with the crankcase 4 to provide a support for the crankshaft.

Although only one connecting rod and piston and cylinder is shown, it is understood that this engine may include a single or a plurality of cylinders. The oil cooling and lubricating system will operate equally as well with a single cylinder or multiple cylinder engine.

The oil pan 5 defines a reservoir for the body of oil 6. The oil pump 25 which is driven by the engine 1 draws oil from the body of oil 6 through the screen 21 and intake conduit 22. A high pressure relief valve 23 is connected to the outlet conduit 24 on the pressure side of the oil pump 25. The high pressure relief valve shunts the pressurized fluid to the reservoir when the pressure becomes excessive in the output side of the pump 25.

The conduit 26 on the discharged side of the pump 25 conveys pressurized fluid to cooler 27. The total volume of the pump 25 passes through the cooler 27 providing the oil pressure does not rise above the pressure setting of the high pressure relief valve 23.

The branch conduit 28 feeds into the piston cooling gallery 29 through the piston cooling regulator valve 30. The piston cooling gallery consists essentially of a plurality of nozzles 31 which spray oil upwardly within the internal portion of piston 13. The interior of the head 17 within the piston 13 is cooled by the impingement of pressurized fluid. The fluid then falls away into the reservoir.

The pressurized fluid from the cooler 27 may follow one of two paths, the one of which is the branch conduit 28 leading to the piston cooling gallery, and the other being through conduit 32, filter 34 and the main oil gallery 33. A bypass valve 21 may be built into the filter 34 to assure positive lubrication through the main oil gallery 33 in event the filter should become clogged.

An alternate illustration provides for flow of pressurized fluid through the cooler 27, conduit 28 and the cooling gallery 29 in parallel with fluid flow through conduit 32, filter 34 and the main gallery 33.

The pressurized fluid in the main oil gallery 33 is in contact with the valve operating mechanism 35 of the piston cooling regulator valve 30. When a predetermined pressure is present within the main oil gallery 33, the valve actuating means 35 biases the valve to an open position permitting the flow of pressurized fluid through the branch conduit 28 and through the piston cooling oil gallery 29.

So long as the oil pump 25 is in operation, fluid will be pressurized within the conduit 24 which will pass through the cooler 27 the filter 34 to the main oil gallery 33. This will assure positive lubrication of the main bearings and the crankpin bearings and all other moving parts in the internal combustion engine.

The main oil gallery 33 consists essentially of a plurality of conduits leading to the main bearings 20. The passage 37 leads from the conduit 38 to the main bearing for the crankshaft 19. The crankshaft 19 is drilled to accommodate the flow of pressurized fluid through the crank arm to the crankpin 18 to provide lubrication of the crankpin. Passage means is also provided from the crankpin bearing longitudinally through the connecting rod 15 to lubricate the wrist pin 14 in the piston 13. The system provides for forced lubrication of all the bearings in the crankshaft and the piston.

The pressurized fluid in the main oil gallery 33 will maintain positive lubrication of the engine so long as the engine is in operation. The high pressure relief valve 23 will only operate when an excess of pressure is present in the system. The piston cooling regulator valve 30 is actuated when a predetermined pressure exists in the main gallery 33. This will permit the flow of pressurized fluid through the piston cooling gallery to cool the pistons when the engine is in operation. A second relief valve is included in the system and positioned at a point in the conduit 38 of the main oil gallery. The relief valve 39 operates in response to the pressure in the main oil gallery to permit the return flow of pressurized fluid to the oil reservoir. For the purpose of illustration only, it could be assumed that the actuating pressure for the piston cooling regulating valve 30 would be approximately 25 pounds per square inch. The main gallery relief valve would operate at approximately 45 pounds per square inch, and the high pressure relief valve 23 would operate at a pressure somewhere in the neighborhood of 180 pounds per square inch. It can be seen that the cooling of the pistons does not create any danger of failure of lubrication in the main oil gallery because the piston cooling gallery does not operate until a predetermined pressure is present in the main oil gallery. When this pressure exists then the piston cooling regulator valve will open permitting the flow of pressurized fluid to the piston cooling gallery to provide cooling of the pistons. If the engine speed becomes excessive and the pressure developed in the system is greater than necessary to operate both systems, the main gallery relief valve will permit return flow of pressurized fluid to the reservoir and also maintain operation of both the main oil gallery and the piston cooling gallery.

The high pressure relief valve is positioned in the system to vent high pressure fluid to the oil reservoir in case of excessively high pressures within the fluid lines. As previously mentioned, the oil filter is preferably constructed with a built in bypass valve to permit the bypass flow of oil around the oil filter in event that the oil filter should become clogged. This will assure positive flow of pressurized fluid to the main oil gallery and assure lubrication of the moving parts.

The operation of the combined lubricating and cooling system will be described in the following paragraphs.

When the engine is in operation, the oil pump 25 is always in operation. The oil pump 25 receives fluid from the body of oil 6 in the reservoir and pressurizes the fluid forcing the pressurized fluid into conduit 26. The oil is then forced through the cooler 27 to reduce the temperature of the oil before it is passed into either the main oil gallery or the piston cooling gallery. The filter 34 is positioned between the cooler 27 and the main oil gallery 33. When the engine is operating at a low speed, the oil pressure in the conduit 26 is relatively small and all of the oil will pass through the filter 34 into the main oil gallery. This will cause the pressurized fluid to flow into the main bearings 20, the crank main bearings 40 and the wrist pin bearings 41. At idling speeds and low load conditions the engine does not require cooling of the pistons to dissipate heat in the engine. An increase in speed will increase the pressure in the conduit 26 and also the main oil gallery 33 causing the valve actuating means 35 of the piston cooling regulator valve 30 to open valve 30. This will permit the flow of pressurized fluid through the piston cooling gallery 29 and spray through the plurality of nozzles 31 onto the pistons 13. The pressurized fluid which has been previously cooled sprayed on the internal portion of the piston head, will dissipate heat from the piston 13. The oil is then permitted to fall away and into the reservoir. So long as the pressure within the system remains below a predetermined value, the oil will continue to pass through the bearings or the piston cooling jet 31. If the pressure rises above a predetermined value the main oil gallery relief valve 39 will open causing the pressurized fluid to be shunted to the reservoir. This limits the maximum pressure in the fluid lines in the main oil gallery and the piston cooling gallery.

As previously mentioned, the filter 34 may have a bypass valve to permit the bypass of pressurized fluid around the filter and assure positive lubrication even though the filter should become clogged.

In event that the system should become overloaded a safety relief valve 23 is provided on the discharged side of the pump 25. This valve only operates when the pressure in the fluid system becomes excessive.

The combination lubricating and cooling system assures positive lubrication of all bearings in the engine. The cooling of the pistons operates only when all the lubricating requirements of the engine have been satisfied. The value of the pressure in the main oil gallery is a positive guide to assure that the lubrication requirements have been met in the main oil gallery. When this condition exists, the actuating means for the piston cooling regulator valve operates to permit the flow of pressurized fluid to the piston cooling gallery and oil is sprayed against the underside of the piston to maintain a lower operating condition of the engine.

The embodiments of the invention in which an exclusive property or privilege is claimed are defined as follows:

1. An engine lubricating and cooling system comprising an oil reservoir, a source of pressurized oil receiving oil from said reservoir, a main oil gallery for lubricating moving parts of the engine, an oil filter in communication between said source of pressurized oil and said main oil gallery, an oil cooling means receiving pressurized oil from said source of pressurized oil, a piston cooling gallery connected to said oil cooler and having nozzles adapted for spraying oil on the underside of the piston for dissipating heat from said piston, a piston cooling regulating valve connected between said main oil gallery and said piston cooling gallery including a valve actuating means operating in response to the pressurized fluid in said main oil gallery opening said valve and permitting the flow of pressurized fluid in said piston cooling gallery when a predetermined pressure exists in said main oil gallery to thereby assure positive lubrication through the main oil gallery and dissipation of heat through said piston cooling gallery when the engine lubrication requirements are satisfied.

2. An engine lubricating and cooling system comprising an oil reservoir, a source of pressurized oil receiving oil from said reservoir, a main lubricating oil gallery for lubricating moving engine parts, a piston cooling oil gallery in parallel with said main lubricating oil gallery, an oil cooler and an oil filter connected between said source of pressurized oil and said main lubricating oil gallery, a conduit means connected intermediate said oil cooler and said oil filter and connected to said cooling gallery for supplying oil to said piston cooling gallery, a piston cooling gallery regulating valve in said piston cooling gallery having hydraulic valve actuating means in said main lubricating oil gallery, said actuating means opening said valve and controlling the flow of oil in said piston cooling gallery responsive to a predetermined pressure in said main lubricating oil gallery.

3. An engine lubricating and cooling system as set forth in claim 2 wherein the main oil gallery includes a relief valve for discharging oil to the reservoir when the pressure in the main oil gallery reaches a predetermined value.

4. An engine lubricating and cooling system as set forth in claim 2 wherein said oil filter has a built-in bypass valve to accommodate the flow of pressurized fluid to said main oil gallery in event said oil filter should become clogged.

5. An engine lubricating and cooling system as set forth in claim 2 wherein said piston cooling gallery includes a plurality of nozzles adapted for directing oil on the underside of a plurality of pistons for cooling said pistons.

6. An engine lubricating and cooling system as set forth in claim 2 wherein the main oil gallery is adapted for providing forced lubrication of the main, crankpin, and wrist pin bearings of a plurality of cylinders in said engine.

7. An engine lubricating and cooling system as set forth in claim 2 wherein a high pressure relief valve is connected to the discharge side of said source of pressurized fluid to discharge fluid to the oil reservoir when the pressure of the discharge side of said pump becomes an excessive value.

References Cited

UNITED STATES PATENTS

| 2,302,552 | 11/1942 | Johnson | 123—196 XR |
| 2,893,514 | 7/1959 | Badertscher et al. | 123—196 XR |

FOREIGN PATENTS

| 833,880 | 3/1952 | Germany. |
| 684,436 | 12/1952 | Great Britain. |

FRED C. MATTERN, Jr., Primary Examiner

MANUEL A. ANTONAKAS, Assistant Examiner

U.S. Cl. X.R.

123—196